(12) United States Patent
Meixner et al.

(10) Patent No.: US 8,631,719 B2
(45) Date of Patent: Jan. 21, 2014

(54) ARRANGEMENT OF POSITION TRANSMITTERS ON A SELECTOR ROD

(75) Inventors: Christian Meixner, Ingolstadt (DE); Mario Schenker, Ingolstadt (DE); Johann Märkl, Ingolstadt (DE)

(73) Assignee: Audi AG, Ingolstadt (DE)

( * ) Notice: Subject to any disclaimer, the term of this patent is extended or adjusted under 35 U.S.C. 154(b) by 1278 days.

(21) Appl. No.: 12/306,205

(22) PCT Filed: Jun. 22, 2007

(86) PCT No.: PCT/EP2007/005522
§ 371 (c)(1), (2), (4) Date: Jan. 23, 2009

(87) PCT Pub. No.: WO2007/147615
PCT Pub. Date: Dec. 27, 2007

(65) Prior Publication Data
US 2009/0288513 A1    Nov. 26, 2009

(30) Foreign Application Priority Data
Jun. 23, 2006   (DE) .................... 10 2006 028 785

(51) Int. Cl.
*B60K 20/00*   (2006.01)
*F16H 59/04*   (2006.01)

(52) U.S. Cl.
USPC ......................................... 74/473.36

(58) Field of Classification Search
USPC ......... 74/335, 473.1, 473.11, 473.12, 473.21, 74/473.36, 473.37; 324/207.24
See application file for complete search history.

(56) References Cited

U.S. PATENT DOCUMENTS

| | | | | |
|---|---|---|---|---|
| 2,092,580 | A | * | 9/1937 | Kelley ................ 192/48.607 |
| 4,592,249 | A | * | 6/1986 | Lehmann et al. .......... 74/473.1 |
| 4,944,356 | A | * | 7/1990 | Oslapas ................... 180/400 |
| 5,031,504 | A | * | 7/1991 | Gratzmuller ................. 91/1 |
| 5,038,627 | A | | 8/1991 | Schwaiger et al. |
| 5,231,352 | A | * | 7/1993 | Huber ................... 324/207.24 |
| 6,202,812 | B1 | * | 3/2001 | Semke .................. 192/48.91 |
| 6,215,299 | B1 | * | 4/2001 | Reynolds et al. ....... 324/207.2 |
| 6,331,772 | B1 | * | 12/2001 | Windte et al. ......... 324/207.24 |
| 6,354,166 | B1 | * | 3/2002 | Balamucki et al. ......... 74/335 |
| 6,484,600 | B1 | * | 11/2002 | Bennett et al. ......... 74/473.11 |

(Continued)

FOREIGN PATENT DOCUMENTS

| | | |
|---|---|---|
| DE | 3314111 A1 | 10/1984 |
| DE | 19961087 A1 | 11/2000 |
| JP | 61084445 A | 4/1986 |

*Primary Examiner* — Troy Chambers
*Assistant Examiner* — Michael Gonzalez
(74) *Attorney, Agent, or Firm* — Novak Druce Connolly Bove + Quigg LLP

(57) ABSTRACT

An arrangement of position transmitters on a selector rod for automatic speed change transmissions in motor vehicles, which interact with housing-mounted position sensors of an electrical speed detection circuit, at least one selector rod on its end regions being movably supported in cross walls of the housing of the transmissions and being actuated by means of a preferably electrohydraulically controlled speed selection unit where the selector rod projects through a through an opening in a cross wall of the transmission, which wall separates the oil compartment into the gear chamber which holds at least the speed selection unit and the position sensors, and the position transmitters are attached directly to the selector rod such that the selector rod with the position transmitters can be mounted through the through the opening as a mounting unit.

8 Claims, 2 Drawing Sheets

(56) References Cited

U.S. PATENT DOCUMENTS

| | | | |
|---|---|---|---|
| 6,739,211 B2 * | 5/2004 | Yamamoto et al. | 74/335 |
| 6,792,821 B1 * | 9/2004 | Yamamoto | 74/335 |
| 6,848,330 B2 * | 2/2005 | Yamamoto | 74/473.12 |
| 6,877,391 B2 * | 4/2005 | Yamamoto | 74/473.12 |
| 6,880,422 B2 * | 4/2005 | Yamamoto | 74/473.12 |
| 7,104,150 B2 * | 9/2006 | Ito et al. | 74/335 |
| 7,240,578 B2 * | 7/2007 | Ogami et al. | 74/340 |
| RE39,781 E * | 8/2007 | Muraoka et al. | 324/174 |

* cited by examiner

ARRANGEMENT OF POSITION TRANSMITTERS ON A SELECTOR ROD

The invention relates to an arrangement of position transmitters on a selector rod for automatic speed change transmissions in motor vehicles

BACKGROUND OF THE INVENTION

Such an arrangement is described by DE 33 14 111 A1, in which two cup-shaped position transmitters are held on the end region of the selector rod on a molded on guide section with the interposition of a compression spring and by way of a screw connection. This requires considerable additional installation space and assembly effort on the speed change transmission.

The object of the invention is to propose an arrangement of the generic type that is more favorable in terms of construction and production engineering and which enables easy installation of the arrangement.

SUMMARY OF THE INVENTION

It is proposed according to the invention that the selector rod project into the gear chamber, which holds at least the speed selection unit and the position sensors through a through hole in the cross wall of the speed change transmission, which wall separates the oil compartment, and that the position transmitters are directly attached to the selector rod such that the selector rod with the position transmitters can be mounted through the through hole as a mounting unit. As a result the position transmitters can be attached to the selector rod in a manner favorable for production engineering and mounted as a unit with the selector rod in the transmission.

The selector rod can be movably supported and sealed in a structurally simple manner in the through hole of the cross wall by means of a sprayed-on plastic sleeve.

Furthermore, there are position transmitters between end-side connecting means of the selector rod on the speed selection unit and the indicated cross wall, from which a structure, which is especially short in the axial direction, is formed.

The position transmitters can preferably be formed by two permanent magnets which are located on a common pole lamination and which interact positively with a projection formed on the selector rod by way of a recess. This results in reliable and precise positioning of the position transmitters relative to the selector rod with structurally simple means. Alternatively, the position transmitters can, however, also be formed by local, magnetized selector rod regions which must be made such that the field intensity there does not dissipate in conjunction with adjacent regions, but forms a defined, locally delineated region. Another alternative option can be to form the position transmitter or transmitters by spraying on plastic material or the like in which there are magnetic particles for formation of a local magnetic region.

Furthermore, a thin-walled protective cap which is connected to the pole lamination can cover the permanent magnets and thus, when indicated, prevent signal interferences of the speed detection circuit.

Alternative or combined attachment processes between the selector rod and the pole lamination call for the pole lamination of the position transmitters to be welded and/or cemented and/or caulked to the selector rod. The permanent magnets are permanently connected to the pole lamination by production engineering.

Alternatively or in addition, the position transmitters can be held on the shift fork by spraying a plastic jacket around it. The indicated plastic cap can then by omitted. The plastic jacket can be made integral with the plastic sleeve for supporting the selector rod in the cross wall in a manner especially favorable to production engineering.

Furthermore, the selector rods of conventional design can preferably be rectangular in cross section, the position transmitters then being attached to the narrow side of the selector rod in a manner favorable to construction and production engineering.

In an automatic speed change transmission with up to six forward gears, preferably three selector rods for forward gears and one selector rod for a reverse gear can be routed through the cross wall which separates the oil compartment in corresponding through holes, the respective directly attached position transmitters lying essentially in a uniform measurement plane of the housing-mounted position sensors. This enables an optionally integral execution of all position sensors with the associated simpler production (internal interconnection) and mounting in the transmission.

DETAILED DESCRIPTION OF THE PREFERRED EMBODIMENTS OF THE INVENTION

Figure 1:
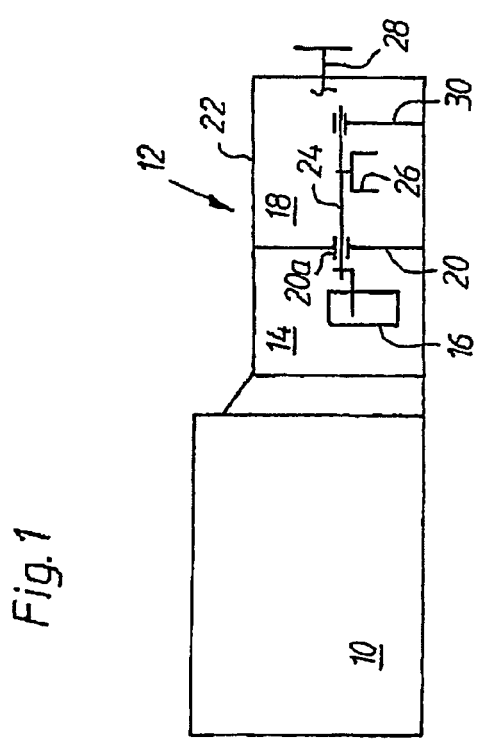
FIG. 1 shows a schematic view of a drive assembly for motor vehicles with automatic speed change transmissions, with a selector rod which penetrates a cross wall which separates the oil compartment.

FIG. 1 shows as an outline sketch a drive assembly for motor vehicles with an internal combustion engine 10 and a downstream speed change transmission 12. The assemblies 10, 12, if not described, can be of any conventional design.

Figure 2:
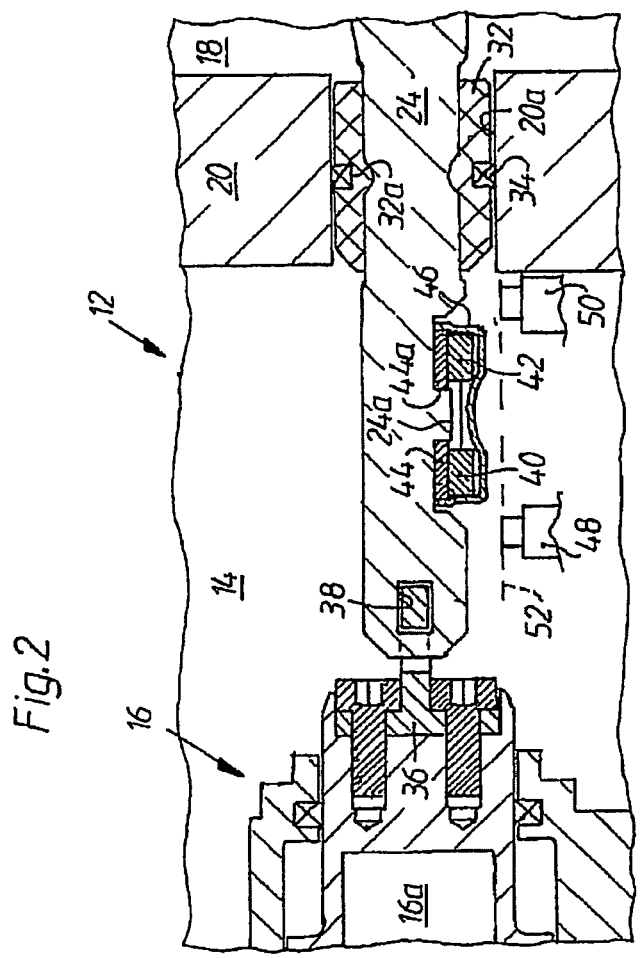
FIG. 2 shows a detailed view of the selector rod as shown in FIG. 1 in the region of the cross wall and with directly attached position transmitters which are provided between a speed selection unit and the cross wall.

In the speed change transmission 12, which is made as an automatic transmission, in the first gear chamber 14 there are clutch means which are not detailed (e.g., a hydraulically actuated double clutch), electrohydraulic control means or speed selection units 16 and position transmitters or position sensors as shown in FIG. 2.

In the second gear chamber 18, which is divided by the cross wall 20 of the housing 22 of the speed change transmission 12, which wall separates the oil compartment, the gear shafts, the gear sets necessary to form the transmission steps, synchronous clutches, etc., are positioned in an opaque manner.

Furthermore, in the speed change transmission 12, the selector rods 24 (only one selector rod 24 is shown) are movably supported and in a conventional design bear the shift forks 26 and in a conventional design interact with the synchronous clutches of the speed change transmission 12 for shifting of the transmission steps. The selector rods 24 are connected to the speed selection units 16 within the gear chamber 14 and can thus be moved out of the neutral position into both shifting directions.

The output to the driven wheels of the motor vehicle can take place by way of an output shaft 28 of the speed change transmission 12 and/or by way of a front differential which is not shown.

The selector rods 24 are supported to be able to move axially in through holes 20a of the cross wall 20 which separates the oil compartment and on the other end in one (or more) cross wall(s) 30 of the housing 22 of the speed change transmission 12.

The gear chambers 14, 18 can be filled with different gear oil or hydraulic oil so that there are the corresponding supports and seals on the gear shafts and selector rods 24 which are routed through.

As shown in FIG. 2, the selector rod 24, which is only partially shown, is movably supported in the cross wall 20 by way of a plastic sleeve 32 which has been sprayed onto the selector rod 24 with a rotationally symmetrical outer periphery in the through hole 20a and is sealed by means of an elastic gasket 34 which is located in the outside groove 32a of the plastic sleeve 32.

On the actuating piston 16a of the speed selection unit 16, a hook-shaped connecting part 36 is attached and positively engages a continuous recess 38 of the selector rod 24 in the shifting direction. The catching of the selector rod 24 in a middle neutral position and in two oppositely oriented operating positions is not shown.

Between the connecting means 36, 38 of the selector rod 24 on the speed selection unit 16 and the cross wall 20 of the gear housing 22, two position transmitters 40, 42 in the form of permanent magnets are directly attached by way of a pole lamination 44 to the selector rod 24 on its narrow side (projecting down in FIG. 2). A thin-walled protective cap 46 covers the position transmitters 40, 42.

The position transmitters 40, 42 overall are arranged such that the position transmitters 40, 42 with the pole lamination 44 and the protective cap 46 can be inserted through the through hole 20a in the cross wall 20 from the gear chamber 18 into the gear chamber 14 as a mounting unit and connected. The position transmitters 40, 42 are housing-mounted in the gear chamber 14 and are opposite the position sensors 48, 50 of the speed detection circuit, in a defined measurement plane 52 (broken line).

The pole lamination 44 has a continuous, non-rotationally symmetrical recess 44a which interacts positively with a corresponding projection 24a on the selector rod 24.

The pole lamination 44 which bears the permanent magnets 40, 42 is caulked to the selector rod 24 for producing a solid connection in the region of the projection 24a and is cemented additionally by applying an adhesive to the contact surfaces between the pole lamination 44 and the selector rod 24.

Alternatively, the pole lamination 44 can also be welded to the selector rod 24, for example, by laser welding.

Furthermore, the pole lamination 44 with the permanent magnets 40, 42 can be jacketed with plastic and thus can be solidly connected to the selector rod 24. This, for example, sleeve-like jacket can be produced especially economically in one piece with the plastic sleeve 32, that is, in one uniform process (not shown).

In an automatic speed change transmission 12 with six forward gears, three selector rods 24 for the forward gears and one selector rod 24 for a reverse gear of the speed change transmission 12 can be routed through the cross wall 20 that separates the oil compartment in the corresponding through holes 20a, and the directly attached position transmitters 40, 42 with the pole lamination 44 can lie essentially in the indicated uniform measurement plane 52 of the housing-mounted position sensors 48, 50. Thus, optionally, all position sensors 48, 50 can be located in a uniform housing (not shown) and can be easily mounted in the gear housing 22 or in the gear chamber 14.

The through hole 20a in the cross wall 20 can also be formed by a bearing sleeve of steel (not shown) which is inserted into the through hole 20a, and in which the plastic sleeve 32 which has been sprayed onto the selector rod 24 slides accordingly.

The invention claimed is:

1. A position sensing assembly for a speed changing transmission having a housing defining a compartment provided with a speed selector unit and a wall having an opening communicating with said compartment, comprising:
   a rod extending through said wall opening, displaceable along the length thereof, connected at an end thereof to said speed selector unit,
   the rod comprising
      a first rod portion disposed between said wall and said connection with said unit, the first rod portion comprising
         a recess, and
         at least one position transmitter disposed in the recess,
      wherein the first rod portion of the rod comprising the at least one position transmitter is insertable through the opening, and
      a second rod portion adjacent to the first portion, the second portion comprising
         a plastic sleeve, sprayed onto the rod; and
         an elastic gasket disposed in the plastic sleeve,
      wherein the rod is movably supported in the plastic sleeve,
      wherein the sprayed-on plastic sleeve is sealed in the opening by the elastic gasket;
   at least one position sensor disposed in said compartment, adjacent a line of travel of said rod and operatively connected to a detection circuit,
   wherein the at least one position transmitter is positionable into and out of excitation relationship with said position sensor upon displacement of said rod along the line of travel thereof.

2. An assembly according to claim 1 wherein said position transmitter is disposed in said recess within the profile of said rod.

3. An assembly according to claim 1 wherein said position transmitter is magnetic.

4. An assembly according to claim 1 wherein said position transmitter is adhesively secured in said rod.

5. An assembly according to claim 1 wherein said position transmitter is magnetic and embedded in a plastic material within said recess.

6. An assembly according to claim 1 wherein said position transmitter comprises magnetic particles disposed in a plastic material within said recess of said rod.

7. An assembly according to claim 1 including a pair of position sensors disposed in said compartment spaced along a line parallel to the line of travel of said rod, and a pair of position transmitters disposed in said recess in said rod, cooperable with said position sensors in detecting the position of said rod along the line of travel thereof.

8. An assembly according to claim 1 including a sealing ring disposed between said layer of plastic material disposed about the perimeter of said rod, and a wall of said wall opening.

* * * * *